United States Patent [19]

Carlyle

[11] Patent Number: 4,919,644
[45] Date of Patent: Apr. 24, 1990

[54] CHAIN CONTROL APPARATUS
[76] Inventor: James P. Carlyle, 3153 Ames, Denver, Colo. 80214
[21] Appl. No.: 263,348
[22] Filed: Oct. 27, 1988
[51] Int. Cl.5 .............................................. F16H 11/08
[52] U.S. Cl. ............................................................ 474/80
[58] Field of Search .................................... 474/77–82; 280/250, 261, 285, 286, 289 R

[56] References Cited

FOREIGN PATENT DOCUMENTS

| 830162 | 7/1938 | France ..................................... 474/80 |
| 53934 | 9/1942 | Netherlands ........................... 474/80 |
| 86100 | 4/1936 | Sweden .................................. 474/80 |
| 222429 | 7/1942 | Switzerland ........................... 474/80 |

Primary Examiner—Thuy M. Bui
Attorney, Agent, or Firm—Klaas & Law

[57] ABSTRACT

Chain control guide apparatus is provided for a bicycle having a chain journaled around spaced apart gears so as to have an upper run and a lower run wherein the chain control guide apparatus, such as an idler pulley, limits movement of the lower run in directions away from the upper run when the bicycle is operated in rough terrain or is used in jumping operations.

20 Claims, 2 Drawing Sheets

CHAIN CONTROL APPARATUS

FIELD OF THE INVENTION

This invention is directed generally to the operation of the chain system for a bicycle or other similar vehicles and more particularly for control apparatus for providing protection for the lower run of the chain drive means.

BACKGROUND OF THE INVENTION

Bicycles have been and still are one of the more popular forms of sports and transportation equipment. The chain drive means in a bicycle is used to transmit the power placed on the driving sprocket by the user to the driven wheel of the bicycle which generally is the rear wheel. In many instances, the driven wheel is provided with a plurality of different sized gears so that the user may use a shift mechanism so as to rotate the driven wheel at different speeds and is commonly referred to as a derailer system such as that described in U.S. Pat. No. 4,343,613 to Leiter et al. It is very essential that the chain drive means used on bicycles equipped with a derailer system be kept clean from deleterious materials which would prevent the proper operation of the chain drive means. This is particular true when the bicycle is operated in rough terrain or when the bicycle is used in jumping operations that result in a force being applied to the lower run of the chain system. In many instances, the weight of the chain and the force applied thereto will be more than enough to overcome the tension applying means of the derailer system so that the lower run of the chain will strike the terrain and have deleterious materials attached thereto.

BRIEF DESCRIPTION OF THE INVENTION

This invention provides chain control apparatus for providing control means for the lower run of the chain drive means of a vehicle so that the lower run will not contact the terrain when the vehicle is operated in rough terrain or is used in jumping operations.

In the preferred embodiment of the invention, the vehicle is a bicycle that has a frame on which are mounted a rotatable driven wheel, a plurality of gear means for rotating the driven wheel at different speeds, rotatable driving means having at least one gear means mounted thereon for rotation therewith, support means mounted on said driving means so that an user may contact the support means and rotate the driving means and at least one chain drive means journaled around at least one of the plurality of gear means and the at least one gear means of said driving means so that the at least one chain drive means has an upper run and a lower run. A rotatable idler pulley means is securely mounted on the bicycle frame so that the plurality of gear means, the at least one gear means and the idler pulley means rotate about axes which are in a generally parallel relationship. At least a portion of the lower run is in contact with and supported by at least a portion of the idler pulley means. The idler pulley means functions to divide the lower run into a first section having upper and lower sides and having at least a portion thereof next adjacent to its contact with the idler pulley means extending generally in a linear direction and a second section having upper and lower sides and having at least portion thereof next adjacent to its contact with the idler gear means extending generally in a linear direction. The idler pulley means is mounted so that the lower side of the first section meets with the lower side of the second section to form an included angle of less than 180 degrees. Movement permitting means connect the idler pulley means to the mounting means to permit displacement of the idler pulley means while maintaining the parallel relationship of the axes of the plurality of gear means, the at least one gear means and the idler pulley means and preferably comprises a parallel motion mechanism.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
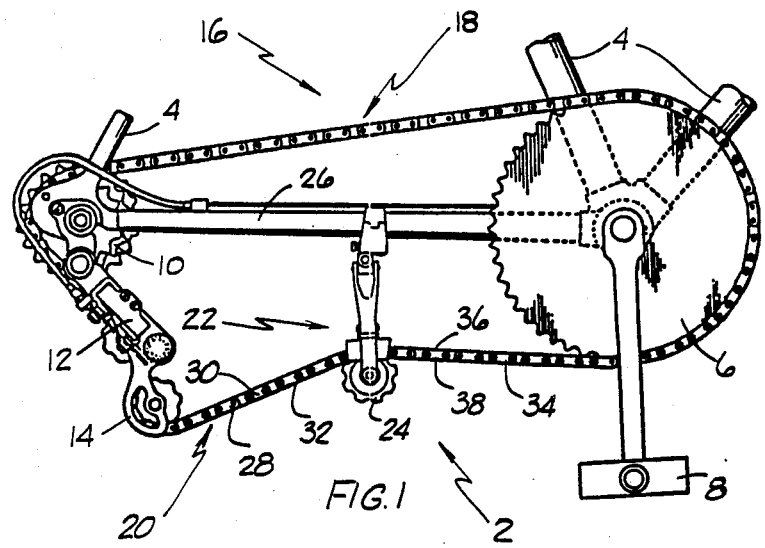
FIG. 1 is a side elevational view of the driving mechanism of a bicycle.

In FIG. 1, there is illustrated the driving mechanism of a bicycle 2 comprising a frame 4 having a driving means comprising a gear means 6 rotatably mounted on the frame 4 and a pedal 8 for rotating the gear means 6. A plurality of gear means 10 are mounted on the frame 4 for rotating a conventional rear wheel (not shown) at different speeds. A conventional guide sprocket wheel 12 and a tensioning means 14 are provided and function in a conventional manner. A chain drive means 16 is journaled around at least one of the plurality of gear means 10 and the gear means 6 so that the chain drive means 16 has an upper run 18 and a lower run 20.

The chain control means 22 comprises an idler pulley means 24 which is mounted on the chain stay means 26 extending between the gear means 6 and the plurality of gear means 10 by mounting means, described more fully below, so that the plurality of gear means 10, the gear means 6 and the idler pulley means 24 rotate about axes which are in a parallel relationship. The lower run 20 is in contact with and supported by the idler pulley means 24 so as to divide the lower run 20 into a first section 28 having upper 30 and lower 32 sides with at least a portion of the lower side 32 next adjacent to its contact with the idler pulley means 24 extending in a linear direction and a second section 34 having upper 36 and lower 38 sides with at least a portion of the lower side 38 next adjacent to its contact with the idler pulley means 24 extending in a linear direction. As illustrated in FIG. 1, the lower side 32 of the first section 28 meets with the lower side 38 of the second section 34 to form an included angle of less than 180 degrees. If desired, the lower run 20 in one position between the plurality of gear means 10 and the gear means 6 can extend completely in a linear direction and the idler pulley means 24 can be located immediately below the lower run 20 so that contact between the idler pulley mean 24 and the lower run 20 would only occur to prevent undesirable downward movement of the lower run 20. Also, if desired, the idler pulley means 24 could comprise guide means formed from a material having a low coefficient of friction such as tetrafluroethylene resin.

Figure 4:
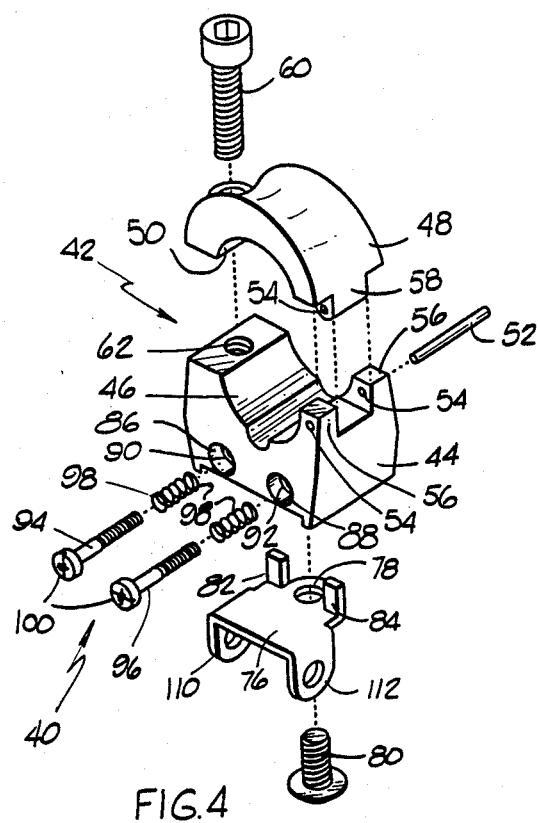
FIG. 4 is an exploded view of the mounting system of FIG. 2.
Figure 6:
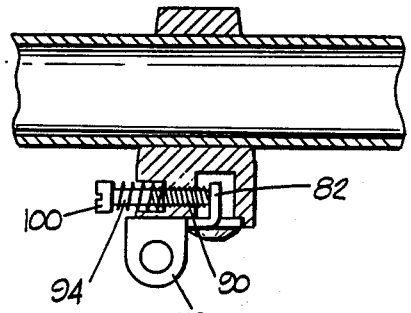
FIG. 6 is a cross-sectional view of a portion of FIG. 2.

The mounting system 40 for mounting the idler pulley means 24 on the chain stay means 26 is illustrated in FIG. 4 and comprises clamping means 42 having a lower portion 44 having an inner surface configuration 46 corresponding to the surface of the chain stay means 26 that it is adapted to contact and an upper portion 48 having an inner surface configuration 50 corresponding to the surface of the chain stay means 26 that it is adapted to contact. The upper portion 48 is pivotally mounted on the lower portion 44 by a pivot pin 52 which extends through openings 54 in the upstanding ears 56 on the lower portion 44 and the depending lug 58 on the upper portion 48. A threaded bolt 60 is mounted in the threaded opening 62 and is tightened therein to apply forces on the upper portion 48 so as to clamp the chain stay means securely between the upper 48 and lower 44 portions.

The lower portion 44 has a hollow interior 70 and a depending stud 72 having a threaded opening 74. A plate member 76 has an opening 78 through which a threaded bolt 80 passes and is threaded into the threaded opening 74 so as to mount the plate member 76 for pivotal movement. The plate member 76 has a pair of spaced apart upstanding ears 82 and 84. The lower portion 44 has a pair of spaced apart recesses 86 and 88 having threaded openings 90 and 92. A pair of threaded bolts 94 and 96 extend through the threaded openings 90 and 92 and contact the upstanding ears 82 and 84 so that the adjustment of the threaded bolts 94 and 96 will pivot the plate member 76 to a position wherein the idler pulley means 24 is properly aligned with the lower run 20. After the alignment is made, the threaded bolts 94 and 96 in contact with the upstanding ears 82 and 84 function to hold the plate member 76 in its desired location. Springs 98 are located between the recesses 86 and 88 and the heads 100 of the threaded bolts 94 and 96.

Figure 3:
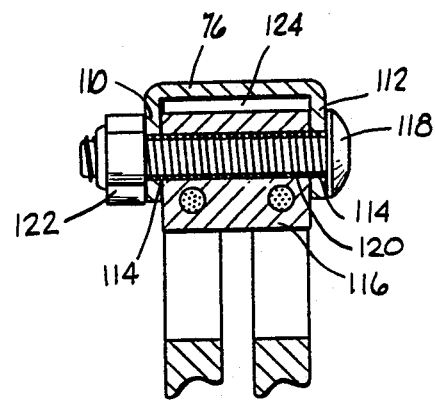
FIG. 3 is a cross-sectional view of a portion of FIG. 2.
Figure 5:
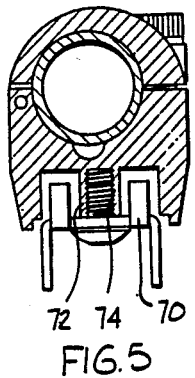
FIG. 5 is a cross-sectional view of a portion of FIG. 2.

Means for preventing breakage of the idler pulley means 24 and its mounting structure is illustrated in FIG. 3. The plate member 76 has a pair of depending ears 110 and 112 having openings 114. A mounting block 116 is located between the depending ears 110 and 112 and is dimensioned so as to be in surface to surface contact therewith. A threaded bolt 118 extends through the opening 114 in the depending ear 112, an opening 120 in the mounting block 116 and a nut 122 is used to apply frictional forces between the ears 110 and 112 and the mounting block 118. A space 124 exists between mounting block 118 and the plate 76 so that it may rotate around the threaded bolt 118. During assembly, the threaded bolt 118 is tightened to apply pressure to the depending ears 110 and 112 so that the contact of the depending ears 110 and 112 on the surface of the mounting block 116 will hold the mounting block 116 to prevent rotation of the mounting block 116 during normal operation thereof but will permit rotation of the mounting block 116 if the idler pulley means 24 strikes a solid object so as to prevent breakage of the idler pulley means 24 and its mounting structure.

Figure 2:
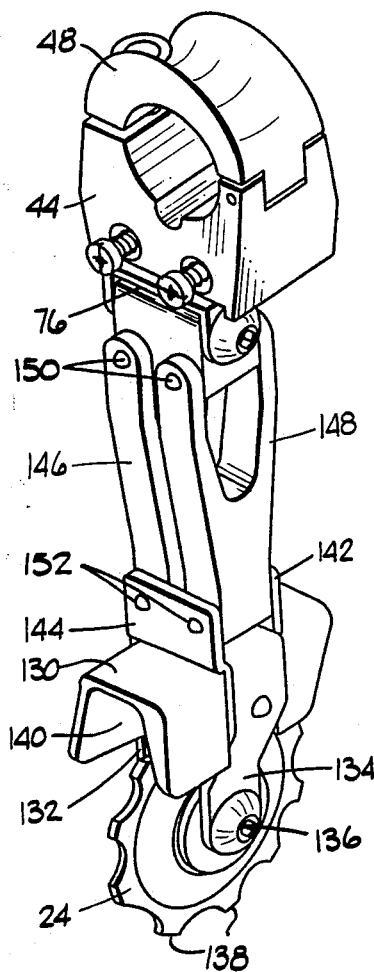
FIG. 2 is a perspective view of the chain control apparatus of this invention.

The mounting means for the idler pulley means 24 is illustrated in FIG. 2. A U-shaped support bracket 130 has a pair of spaced apart mounting arms 132 and 134 having openings therein through which a mounting bolt 136 extends. The idler sprocket means 24 is mounted between the mounting arms 132 and 134 for rotation on the mounting bolt 136. The idler sprocket means 24 has a plurality of teeth 138 adapted to contact the lower run 20 so as to rotate the idler sprocket means 24. A clearance space 140 exists between the top of the idler sprocket means 24 and the U-shaped support bracket 130 to provide for the passage of the lower run 20 therethrough. The U-shaped support bracket 130 has a pair of spaced apart upstanding mounting lugs 142 and 144. A pair of control arms 146 and 148 are pivotally mounted on the mounting block 116 and the pair of mounting lugs 142 and 144 by pivot means 150 and 152. This pivotal mounting of the control arms 146 and 148 provides a parallel motion mechanism for the control arms 146 and 148 so that the idler sprocket means 24 is free to move while the rotational axis thereof remains parallel to the rotational axes of the gear means 6 and the plurality of gear means 10.

Figure 7:
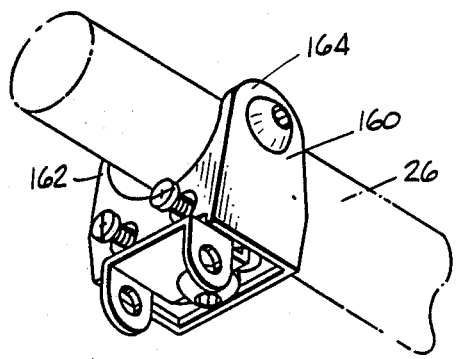
FIG. 7 is a view of another embodiment of the mounting system.
Figure 8:
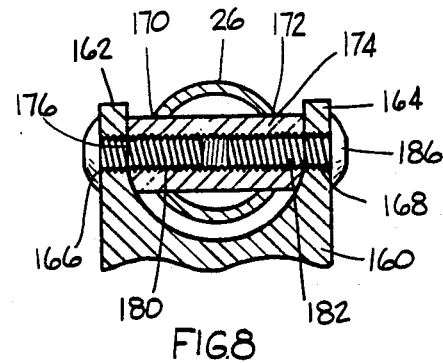
FIG. 8 is a cross-sectional view of a portion of FIG. 7.

Another embodiment of the mounting system 40 is illustrated in FIGS. 7 and 8. A mounting member 160 has a pair of spaced apart upstanding mounting lugs 162 and 164 having threaded openings 166 and 168. A pair of aligned openings 170 and 172 are formed in the chain stay means 26 and a mounting stud 174 having a threaded opening 176 extending therethrough passes through the aligned openings 170 and 172. Threaded bolts 180 and 182 extend through the openings 166 and 168 and are in threaded engagement with the threaded opening 176 so that the bolts 180 and 182 may be tightened to clamp the mounting lugs 162 and 164 between the heads 184 and 186 of the threaded bolts 180 and 182 and the mounting stud 174.

While an illustrative and presently preferred embodiment of the invention has been described in detail herein, it is to be understood that the inventive concepts may be otherwise variously embodied an employed and that the appended claims are intended to be construed to include such variations except insofar as limited by the prior art.

What is claimed is:

1. Apparatus for use with a bicycle to control undesirable chain travel comprising:
   a bicycle frame;
   a plurality of gear means for rotating at least one driven wheel means at different speeds;
   driving means rotatably mounted on said bicycle frame for rotating said at least one driven wheel means and having at least one gear means mounted thereon for rotation therewith;
   support means mounted on said driving means so that a user may contact said support means and rotate said driving means;
   at least one chain drive journaled around at least one of said plurality of gear means and said at least one gear means of said driving means so that said at least one chain drive has an upper run and a lower run;
   said upper and lower runs lying generally in the same plane;
   chain tensioning means for maintaining the proper tension on said chain drive;
   chain control guide means for guiding said chain and having an opening extending therethrough;
   mounting means for securely mounting said chain control guide means on said bicycle frame so that said lower run passes through said opening;

at least a portion of said lower run being in contact with and supported by at least a portion of said chain control guide means;

said chain control guide means providing a positive, relatively fixed support to prevent contact of said lower run with the terrain over which the bicycle is operating;

said chain control guide means dividing said lower run into a first section having upper and lower sides and having at least a portion thereof next adjacent to its contact with said chain control guide means extending generally in a linear direction and a second section having upper and lower sides and having at least a portion thereof next adjacent to its contact with said chain control guide means extending generally in a linear direction; and said lower side of said first section meeting with said lower side of said second section to form an included angle of less than 180 degrees.

2. Apparatus as in claim 1 wherein said chain control guide means comprises:

idler pulley means; and said mounting means mounting said idler pulley means so that said plurality of gear means; said at least one gear means and said idler pulley means rotate about axes which are in a generally parallel relationship.

3. Apparatus as in claim 1 wherein:

movement permitting means comprising a parallel motion mechanism for connecting said chain control guide means to said mounting means.

4. Apparatus as in claim 1 wherein said mounting means comprises:

a clamp releasably secured to said bicycle frame;

a support plate pivotally mounted on said clamp;

a support block connected to said support plate; and at least one control arm extending between and pivotally connected to said support block and said chain control guide means.

5. Apparatus as in claim 4 wherein said at least one control arm comprises:

at least two control arms extending between and pivotally connected to each of said support block means and said chain control guide means.

6. Apparatus as in claim 4 wherein:

said support plate pivots about an axis lying in a plane extending in a direction between said upper and lower runs; and said at least two control arms pivot about axes extending generally in the direction between said driving means and said plurality of gear means.

7. Apparatus as in claim 6 wherein said chain control guide means comprises:

idler pulley means; and said mounting means mounting said idler pulley means so that said plurality of gear means; said at least one gear means and said idler pulley means rotate about axes which are in a generally parallel relationship.

8. Apparatus as in claim 7 and further comprising:

said support block being pivotally connected on said support plate;

frictional securing means for securing said support block means, to said support plate means so that said idler pulley means remains in operative position during normal operation of said bicycle; and said support block pivoting about an axis extending in a direction generally parallel to said axis of rotation of said idler pulley means so that said control arms, said support block means and said idler pulley means may be rotated to prevent breakage thereof if a solid object is struck by said idler pulley means.

9. Apparatus as in claim 8 and further comprising:

chain stay means extending between said driving means and said driven wheel means and wherein said mounting clamp means is releasably secured to said chain stay means.

10. Apparatus as in claim 9 wherein said frictional securing means comprises:

a pair of spaced apart ears extending downwardly from said support plate means;

aligned openings in said ears;

a central opening in said support block means;

said support block means mounted between and substantially in contact with said ears so that said central opening therein is aligned with said aligned openings;

a pivot rod passing through said aligned openings and said central opening and having opposite end portions extending outwardly from each of said ears; and clamping means on said opposite end portions for urging said ears into engagement with said support block means to provide frictional forces tending to prevent pivotal movement of said support block means.

11. Apparatus as in claim 6 and further comprising:

adjusting and locking means for pivoting said support plate means relative to said mounting clamp means and for locking said support plate means in a desired position.

12. Apparatus as in claim 11 wherein said adjusting and locking means comprises:

a pair of spaced apart lugs extending upwardly from said support plate means and located so that said pivot axis of said support plate means is located between said spaced apart lugs;

a pair of spaced apart threaded openings extending through said mounting clamp means; and a threaded bolt having tool receiving head portions for turning said bolts extending outwardly from said threaded openings and lug engaging end portions extending outwardly from said threaded openings and adapted to selectively contact one of said spaced apart lugs to move said support plate mean about its pivot axis or to contact both of said spaced apart lugs to lock said support plate means at a desired location.

13. Apparatus as in claim 11 and further comprising:

said support block means being pivotally mounted on said support plate means;

frictional securing means for securing said support block means to said support plate means so that said idler pulley means remains in operative position during normal operation of said bicycle; and said support block means pivoting about an axis extending in a direction generally parallel to said axis of rotation of said idler pulley means so that said control arms, said support block means and said idler pulley means may be rotated to prevent breakage thereof if a solid object is struck by said idler pulley means.

14. Apparatus as in claim 13 and further comprising:

chain stay means extending between said at least one means and said plurality of gear means and wherein said mounting clamp means is releasably secured to said chain stay means; and gear teeth on said idler pulley means.

15. Apparatus as in claim 14 wherein said frictional securing means comprises:

a pair of spaced apart ears extending downwardly from said support member means;

aligned openings in said ears;

a central opening in said support block means;

said support block means mounted between and substantially in contact with said ears so that said central opening therein is aligned with said aligned openings;

a pivot rod passing through said aligned opening and said central opening and having opposite end portions extending outwardly from each of said ears; and clamping means on said opposite end portions for urging said ears into engagement with said support block means to provide frictional forces tending to prevent pivotal movement of said support block means.

16. Apparatus for use with a bicycle to control undesirable chain travel comprising:

a bicycle frame;

a plurality of gear means for rotating at least one driven wheel means at different speeds;

driving means rotatably mounted on said bicycle frame and having at least one gear means mounted thereon for rotation therewith;

support means mounted on said driving means so that a user may contact said support means and rotate said driving means;

at least one chain drive means journaled around at least one of said plurality of gear means and said at least one gear means of said driving means so that said at least one chain drive means has an upper run and a lower run;

said upper and lower runs lying generally in the same plane;

chain tensioning means for maintaining the proper tension on said chain drive means;

chain control guide means having an opening extending therethrough;

mounting means for securely mounting said chain control guide means on said bicycle frame so that said lower run passes through said openings; and said chain control guide means having a relatively fixed support surface adapted to be contacted by portions of said lower run so as to limit movement of said lower run in a direction away from said upper run.

17. Apparatus as in claim 16 wherein:

movement permitting means comprising a parallel motion mechanism for connecting said chain control guide means to said mounting means.

18. Apparatus as in claim 16 wherein said mounting means comprises:

clamp means releasably secured to said bicycle frame;

support plate means pivotally mounted on said mounting clamp means;

support block means connected to said support member means; and at least one control arm extending between and pivotally connected to said support block means and said chain control guide means.

19. Apparatus as in claim 18 wherein:

said support plate means pivots about an axis lying in a plane extending in a direction between said upper and lower runs.

20. Apparatus as in claim 19 and further comprising:

said support block means being pivotally connected on said support plate means;

frictional securing means for securing said support block means to said support plate means so that said chain control guide means remains in operative position during normal operation of said bicycle; and said support block means pivoting about an axis extending in a direction generally parallel to said axis of rotation of said at least one gear means so that said control arms, said support block means and said chain control guide means may be rotated to prevent breakage thereof if a solid object is struck by said chain control guide means.

* * * * *